F. E. OTT.
ROAD DRAG.
APPLICATION FILED APR. 20, 1908.
899,798.
Patented Sept. 29, 1908.
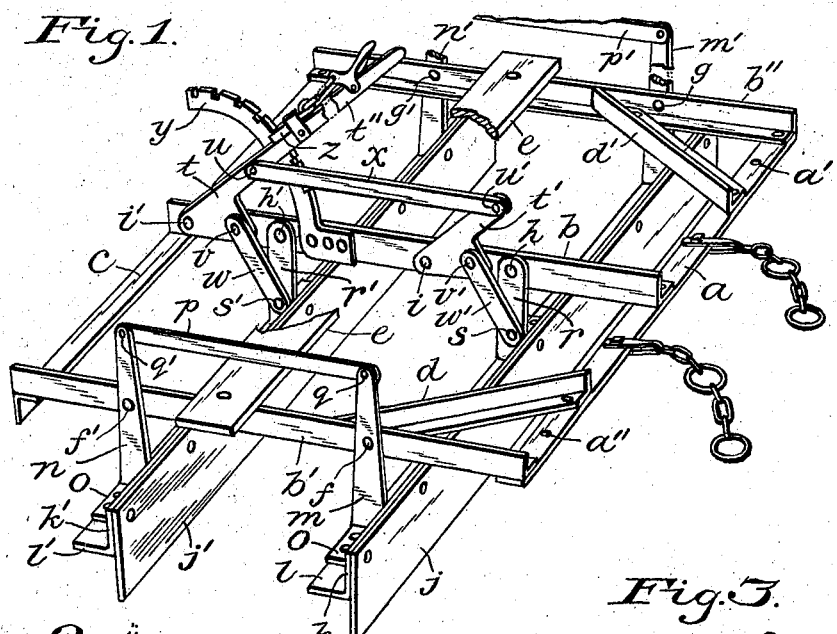
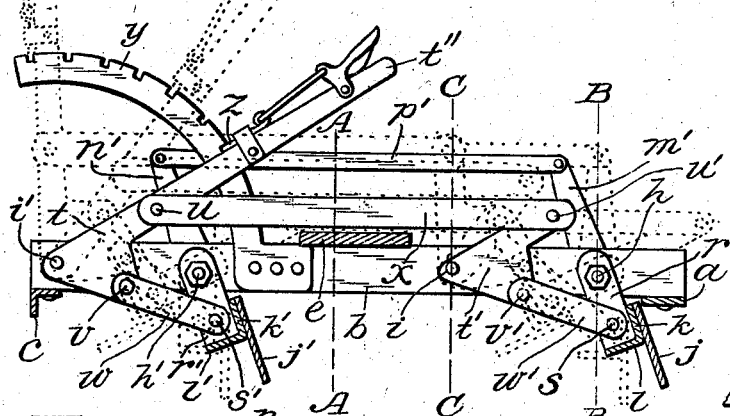
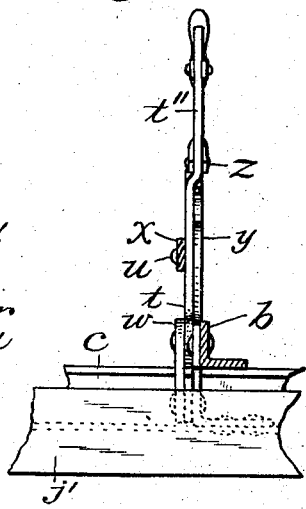
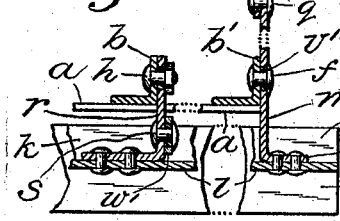
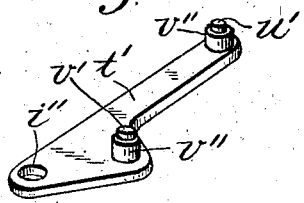
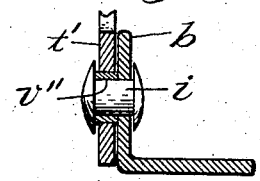
WITNESSES:
J. H. Gardner
K. R. Woddell
INVENTOR:
Frank E. Ott,
BY E. T. Silvius,
ATTORNEY.

UNITED STATES PATENT OFFICE.

FRANK E. OTT, OF INDIANAPOLIS, INDIANA.

ROAD-DRAG.

No. 899,798.	Specification of Letters Patent.	Patented Sept. 29, 1908.

Application filed April 20, 1908. Serial No. 428,090.

*To all whom it may concern:*

Be it known that I, FRANK E. OTT, a citizen of the United States, residing at Indianapolis, in the county of Marion and State of Indiana, have invented certain new and useful Improvements in Road-Drags; and I do declare the following to be a full, clear, and exact description of the invention, reference being had to the accompanying drawings, and to the letters and figures of reference marked thereon, which form a part of this specification.

This invention relates to drags or scrapers of the type that are designed to be used on streets or highways for the purpose of leveling or smoothing the road surfaces.

Objects of the invention are to provide improvements in road drags whereby the frames may be strengthened without materially adding weight thereto, and to provide improved adjusting apparatus for scraping blades; and the invention consists essentially in providing the drag frame with cam-levers and links that operate as powerful knuckle-joint levers for adjusting the blades with respect to the frame, the adjusting devices being so designed as to exert the maximum force when most required; and the invention consists further in the novel parts and combinations and arrangements of parts, as hereinafter particularly described and defined in the following claims.

Referring to the drawings, Figure 1 is a perspective view of the improved drag with minor parts broken away; Fig. 2, a vertical sectional view approximately at the middle of the implement; Fig. 3, a fragmentary sectional view on the plane of the line A A in Fig. 2 when the blades are vertical; Fig. 4, a fragmentary sectional view on the line B B in Fig. 2 with blades vertical; Fig. 5, a perspective view of one of the cam-levers, and Fig. 6, a fragmentary sectional view on the line C C in Fig. 2.

Similar reference characters designate like elements or features of construction throughout the drawings.

As preferably constructed the improved drag comprises a draw-bar $a$ of suitable length having a suitable number of holes $a'$ and $a''$ therein into which draft devices may be connected, the draw-bar being a part of the drag frame, and a main-beam $b$ is attached at one of its ends to the middle portion of the draw-bar, two end beams $b'$ and $b''$ being attached at ends thereof to the ends of the draw-bar and extending parallel with the main beam, the opposite or rear ends of the beams having a tie-bar $c$ attached thereto. A brace $d$ is attached to the draw-bar and also to the beam $b'$, a similar brace $d'$ being attached also to the draw-bar and to the beam $b''$, the braces being arranged diagonally to the parts to which they are attached. Preferably the beams and diagonal braces and also the tie-bar are formed of L-section angle-iron. A platform $e$ is attached to the tops of the beams for carrying the driver and operator. The end beam $b'$ has two pivots $f$ and $f''$ spaced a suitable distance apart and the beam $b''$ has two similar pivots $g$ and $g'$, the main beam $b$ having two pivots $h$ and $h'$. The pivots $f$, $g$, and $h$ are in alinement and the pivots $f''$, $g'$ and $h'$ are in alinement. A beam $b$ has also a pivot $i$ arranged rearward of the pivot $h$ and another pivot $i'$ arranged rearward of the pivot $h'$.

Any suitable number of scraping blades may be employed, suitable connections therefor being provided, but for the purpose of describing the invention two blades $j$ and $j'$ are provided in the present instance, one blade having a plate $k$ secured to the upper portion of the rear side thereof and the other blade having a similar plate $k'$ attached to the upper portion of the rear side thereof, one plate having an angle-flange $l$ extending rearwardly from the lower edge thereof and the other plate having a similar flange $l'$ thereon. An arm $m$ is mounted between its ends on the pivot $f$ and a similar arm $m'$ is mounted on the pivot $g$; another similar arm $n$ is mounted on the pivot $f'$ and a like arm $n'$ is mounted on the pivot $g'$. Each arm has a foot $o$ formed on the lower end thereof by which the arms $m$ and $m'$ are rigidly attached to the flange $l$ and the other two arms $n$ and $n'$ are attached to the flange $l'$, so that the frame is supported somewhat above the scraping blades, which is desirable when heavy work is required. The upper ends of the arms $m$ and $n$ are connected by a rod $p$ by means of pivots $q$ and $q'$ and the upper ends of the arms $m'$ and $n'$ are similarly connected by a rod $p'$. A relatively shorter arm $r$ is connected to the pivot $h$ and attached to the flange $l$, a similar arm $r'$ being connected to the pivot $h'$ and attached to the flange $l'$. The arm $r$ has a pivot $s$ that is arranged near the flange $l$ and the other arm $r'$ has a similarly arranged pivot $s'$.

A cam-lever $t$ is mounted on the pivot $i'$ and another cam-lever $t'$ is mounted on the pivot $i$, the cam-lever $t$ having an extension arm $t''$ for operating or adjusting the scraping blades. The cam-lever $t$ has a pivot $u$ and the cam-lever $t'$ has a pivot $u'$. Also the cam-lever $t$ has a pivot $v$ that is arranged forward of the plane of the pivots $i'$ and $u$, the other cam-lever $t'$ having a pivot $v'$ that is arranged forward of the plane of the pivots $i$ and $u'$ so that while the pivots $u$ and $u'$ move in arcs above the plane of the top of the main beam $b$ the other pivots $v$ and $v'$ move in arcs between the pivots $i'$ and $i$ and the arms of the scraping blades. A stiff link $w$ is connected to the pivot $s'$ and also to the pivot $v$ and a similar link $w'$ is connected to the pivot $s$ and also to the pivot $v'$ whereby connections are made between the cam-lever and the arms of the scraper blades for operating and controlling the blades. A connecting-rod $x$ is connected to the pivots $u$ and $u'$, so as to operate the cam-lever $t'$ when the lever-arm $t''$ is operated. A notched-latch bar $y$ is secured to the beam $b$ and is curved upward and rearward adjacent to the lever-arm $t''$, the latter being provided with a latch $z$ to enter the notches of the latch-bar and hold the lever against movement.

Each cam-lever as $t'$, has a pivot-hole $i''$, that receives the pivot $i$ or $i'$, and the pivots as $v'$ and $u'$ preferably have thimbles $v''$ thereon so that ordinary rivets may be employed as pivots and riveted over against the thimbles so as to secure the pivots to one of the members while the other member connected by the pivot may rotate on the thimble.

In practical use when the blades $j$ and $j'$ are moved forward as in Fig. 2, the maximum strains will occur, since the blades will cut under or into the ground and require considerable power for readjustment of the blades while in operation, but in the present construction it will be observed that the links $w$ and $w'$ extend in straight lines between the pivots of the arms $r$ and $r'$ and the pivots $i$ and $i'$, so that but little effort is required in readjusting the lever arm $t''$, and when the arm $t''$ is moved near the vertical position as indicated by broken lines, the leverage of the cam-levers will be lessened, but the blades will be in trailing angles and require but little effort to readjust them. It will be seen also in addition to the aforementioned advantages there are comparatively few parts comprised in the adjusting apparatus and they are calculated to be strong, durable and economical in use.

Having thus described the invention what is claimed as new, is—

1. A road drag including a frame comprising a plurality of frame beams, a plurality of blades each connected with the beams and movable to different angles thereto, a lever for moving the blades to different angles, means acting when the blades are being moved to acute angles to the beams in one direction to augment the power of the lever to move the blades, said means acting to decrease the power of the lever when the blades are being moved to acute angles to the beams in the opposite direction, and means for locking the lever when at rest.

2. A road drag including a plurality of blades, angle flanges attached to the blades, connecting arms attached to the flanges and having stiff links pivoted thereto near to the flanges, a frame comprising a plurality of beams that are pivoted to the arms, one of the beams having a plurality of cam-levers pivoted thereto that are pivoted to the links, and connections between the plurality of blades.

3. A road drag including a frame comprising a plurality of frame beams, one of the beams having a plurality of cam-levers pivoted thereto, a plurality of blades each adjustably connected with the frame beams, a plurality of stiff links of which one link is pivoted to one of the cam-levers and operatively connected with one of the blades and another link is pivoted to another one of the cam-levers and operatively connected with another one of the blades, and means for operating the plurality of cam-levers simultaneously.

4. A road drag including a plurality of frame beams, a plurality of bars attached to opposite ends of the beams, a plurality of angle-braces attached to one of the bars and also to two of the beams, a plurality of cam-levers and also a plurality of arms pivoted to one of the beams, said beam having a latch-bar attached thereto, each cam-lever having two pivots thereon, one of the pivots being connected by a rod that is connected to one of the pivots of another one of the cam-levers a latch on one of the cam-levers to engage the latch-bar, a plurality of blades attached to the arms, a plurality of stiff links each pivoted to one of the arms and also to the remaining one of the pivots of one of the cam-levers, and other arms attached to the blades and pivoted to other ones of the beams, the other arms of the plurality of blades being connected together.

5. In a road drag, the combination of a frame, a plurality of blades having each an arm pivoted at its end to the frame and having a stiff link pivoted thereto, each blade having also a plurality of other arms that are pivoted also to the frame, a plurality of cam devices mounted movably on the frame and connected to the links of the plurality of arms for the movement and control thereof, and means for latching the plurality of devices.

6. In a road drag, the combination with a frame comprising a main beam and end beams, of a plurality of arms pivoted to the main beam and having each a stiff link pivoted thereto, each arm having a blade attached thereto, arms attached to the blades and pivoted to the end beams, a plurality of cam-levers pivoted to the main beam and each having two pivots thereon, one of the two pivots being out of alinement with the plane of the other pivot and the pivot on which the cam-lever is mounted and connected to one of the links, one of the cam-levers having an extension lever-arm thereon, and a rod connecting the plurality of cam-levers together.

In testimony whereof, I affix my signature in presence of two witnesses.

FRANK E. OTT.

Witnesses:
HARRY D. PIERSON,
E. T. SILVIUS.